US009146784B2

(12) United States Patent
Ramanathaiah et al.

(10) Patent No.: US 9,146,784 B2
(45) Date of Patent: Sep. 29, 2015

(54) INVOCATION OF WEB SERVICES BASED ON A POLICY FILE INCLUDING PROCESSES OF A WORKFLOW ASSOCIATED WITH USER ROLES

(75) Inventors: Gurudutta Ramanathaiah, Bangalore (IN); Deepak Ramakrishnan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 975 days.

(21) Appl. No.: 12/534,400

(22) Filed: Aug. 3, 2009

(65) Prior Publication Data
US 2011/0029977 A1 Feb. 3, 2011

(51) Int. Cl.
G06F 9/46 (2006.01)
G06Q 10/00 (2012.01)
G06F 9/50 (2006.01)

(52) U.S. Cl.
CPC .................... *G06F 9/5038* (2013.01)

(58) Field of Classification Search
None
See application file for complete search history.

(56) References Cited

U.S. PATENT DOCUMENTS

| 7,340,469 | B1 * | 3/2008 | Alghathbar et al. .................. 1/1 |
| 7,475,335 | B2 | 1/2009 | Krishna et al. |
| 7,479,875 | B2 | 1/2009 | Fehling et al. |
| 7,617,230 | B2 * | 11/2009 | Srivastava .............................. 1/1 |
| 8,417,715 | B1 * | 4/2013 | Bruckhaus et al. ........... 707/758 |
| 2003/0154232 | A1 * | 8/2003 | Beringer et al. .............. 709/102 |
| 2003/0220925 | A1 * | 11/2003 | Lior ................................. 707/10 |
| 2005/0096960 | A1 * | 5/2005 | Plutowski et al. ................ 705/8 |
| 2005/0149375 | A1 * | 7/2005 | Wefers ............................. 705/9 |
| 2005/0251527 | A1 | 11/2005 | Phillips et al. |
| 2005/0262549 | A1 * | 11/2005 | Ritt et al. ......................... 726/1 |
| 2006/0004802 | A1 | 1/2006 | Phillips et al. |
| 2006/0074730 | A1 * | 4/2006 | Shukla et al. ..................... 705/8 |
| 2006/0074731 | A1 * | 4/2006 | Green et al. ...................... 705/8 |
| 2006/0074915 | A1 | 4/2006 | Bhandarkar et al. |
| 2007/0033079 | A1 * | 2/2007 | Rits et al. ......................... 705/7 |
| 2007/0061260 | A1 * | 3/2007 | deGroeve et al. ............... 705/44 |
| 2007/0150936 | A1 * | 6/2007 | Maes ................................ 726/1 |
| 2008/0016554 | A1 * | 1/2008 | Rits .................................. 726/4 |
| 2008/0082390 | A1 * | 4/2008 | Hawkins et al. ................. 705/9 |
| 2008/0141336 | A1 * | 6/2008 | Haller .............................. 726/1 |
| 2008/0243524 | A1 * | 10/2008 | Agrawal et al. .................. 705/1 |
| 2008/0300838 | A1 | 12/2008 | Drumm et al. |
| 2009/0064104 | A1 * | 3/2009 | Baeyens et al. .............. 717/114 |

(Continued)

OTHER PUBLICATIONS

Barnickel et al., "Semantic System Integration—Incorporating Rule-based Semantic Bridges into BPEL Processes," [online], [retrieved on Jan. 22, 2009]. Retrieved from the internet <URL/ftp.informatik.rwth-aachen.de/Publications/CEUR-WS/Vol-359/Paper-2.pdf>.

(Continued)

*Primary Examiner* — Tammy Lee
(74) *Attorney, Agent, or Firm* — Kilpatrick Townsend & Stockton LLP

(57) ABSTRACT

Techniques for orchestrating workflows are disclosed herein. In an embodiment, a method of orchestrating a workflow is disclosed. In an embodiment, data is stored in a policy file which associates attributes with processes. User input is received. A process associated with an attribute is selected, where the attribute is based on the user input. The selected process is performed as part of the workflow. Also, processes may be added dynamically as part of any category inside the policy file without having to recompile or redesign the logic of the BPEL project.

17 Claims, 5 Drawing Sheets

(56) References Cited

U.S. PATENT DOCUMENTS

| | | | |
|---|---|---|---|
| 2009/0249290 A1* | 10/2009 | Jenkins et al. | 717/109 |
| 2010/0162406 A1* | 6/2010 | Benameur et al. | 726/26 |
| 2010/0251242 A1* | 9/2010 | Sivasubramanian et al. | 718/100 |

OTHER PUBLICATIONS

Shi et al., "Using State Machine to Integrate Human Activity into BPEL in Dartflow," [online], [retrieved on Jan. 22, 2009]. Retrieved from the internet <URL//ieeexplore.ieee.org/stamp/stamp.jsp?arnumber=4026981&isnumber=4026874>.

"Harri's Oracle Technology Blog: Switching BPEL Process File Based Decision Service to WebDAV Based," [online], [retrieved on Jan. 22, 2009]. Retrieved from the internet <URL//kaukovuo.blogspot.com/2008/03/switching-bpel-process-file-based.html>.

"BPEL Project," [online], [retrieved on Jan. 22, 2009]. Retrieved from the internet <URL.eclipse.org/bpel>.

"WebSphere Process Server Tutorial: Invoking a BPEL Business Process from a Web Application," [online], [retrieved on Jan. 23, 2009]. Retrieved from the internet <URL.webagesolutions.com/knowledgebase/waskb/waskb023/index.html.

* cited by examiner

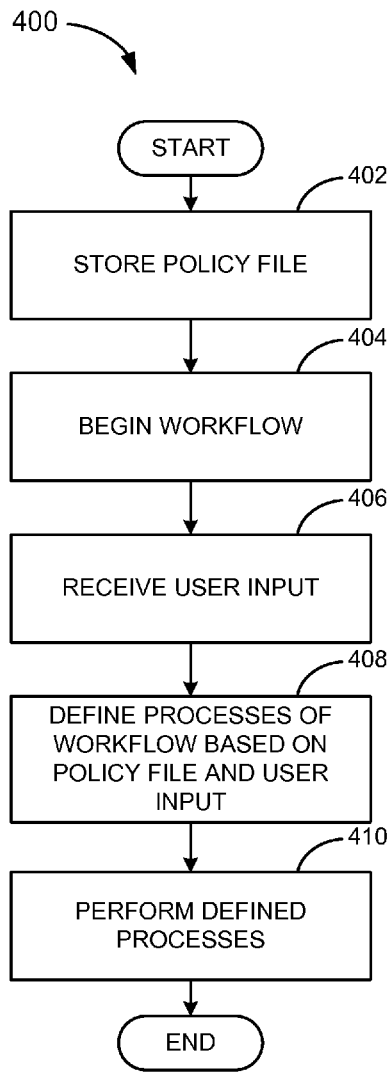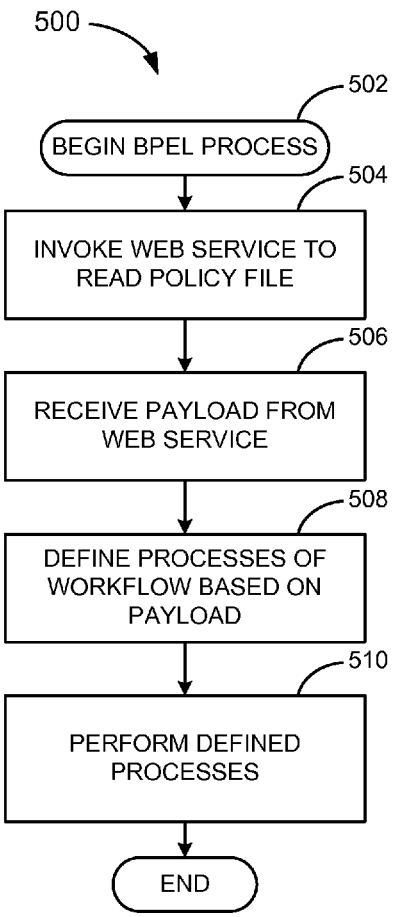
*FIG. 4*     *FIG. 5*

INVOCATION OF WEB SERVICES BASED ON A POLICY FILE INCLUDING PROCESSES OF A WORKFLOW ASSOCIATED WITH USER ROLES

BACKGROUND OF THE INVENTION

Businesses utilize a large number of applications in their day-to-day operations. For example, applications for accounting, human resources, sales, and other departments each may utilize specialized applications that facilitate operations of that department. However, while each department may have its own specific functions and duties, information may be shared across multiple departments. As an example, an accounting department computer system may rely on data from a human resources computer system or may even utilize certain functions of a human resources computing system. Accordingly, it is often desirable to integrate the various systems of a business such that they can share data and call on each other to perform various functions as appropriate.

One approach to integration of business systems has been through service-oriented architecture (SOA). With SOA, business developers make functions of different systems available to one another over a network by passing data to one another using one or more protocols. One popular way of implementing SOA is through the use of web services where functions of various business systems are made accessible over standard Internet protocols. Web services may be utilized within an organization to integrate the organization's systems. Additionally, web services of third parties may be utilized in order to provide increased functionality within a business.

It is not uncommon for a business application to utilize one or more web services during its execution. As an example, an application for a travel agent may utilize external web services of airlines, hotels, and other travel-related service providers in order to provide price quotations to a customer and/or to order one or more services. The application may also use internal web services, for example, to retrieve customer information that is stored in a database maintained by the travel agency. As another example, when a new employee arrives at an organization, the employee needs to be set up with the various business systems, such as a human resources system, an email system, and any other system used for the employee's duties. Instead of manually setting the employee up with each system, which may involve inputting the same data into many different systems, workflows may be used in order to set the employee up from a central location and to avoid repeatedly entering the same data.

An application making use of web services typically must orchestrate the web service being used. One way of doing this that has developed is through the use of the business process execution language (BPEL), which is an executable language for orchestrating the interactions with web services. Typically, web services are first published (either internally or externally) and then orchestrated into business flows. The orchestration of the business flows may be embodied in a BPEL file which is executed by an orchestration server which invokes the various services and processes the payload which is being passed on from the invoking application to the BPEL process's.

A BPEL process (workflow) typically comprises a plurality of child processes (generically referred to as processes) that are performed according to a BPEL file for the BPEL process. For instance, continuing the new employee example above, a BPEL process of creation of the employee's identity in the business' systems may include child processes of seeking approval from a manager, telling other systems about the access rights granted to the employee, and completing the parent process by providing a message that the identity has successfully been created. Generally, the BPEL file, as executed by an orchestration server, defines when and how the child processes are performed. For instance, the BPEL file may specify that certain child processes are to be performed in a particular order, that a payload from one process is used in another process, or that certain child processes are performed when certain conditions are fulfilled or certain logic needs to be called continuously or multiple times.

A BPEL process (workflow) may proceed according to one of several possibilities. For instance, in the above new-employee example, creation of an identity may proceed quite differently if the new employee is a vice president of a division than if the new employee is a receptionist. The vice president may require, for example, access to confidential and sensitive data used in an accounting system, while a receptionist would have no use for such information and, therefore, it would be an unnecessary risk to register the receptionist with the accounting system.

Typically, BPEL processes are created to define multiple child processes for all possibilities and design the workflow such that the proper child process or processes are invoked depending on some user input, such as the type of employee being registered. Designing BPEL workflows in this manner means that the business logic of the workflow is static and requires changing when new processes are to be included. Also, designing workflows in this way does not provide an administrator a capability of dynamically deciding which web services to invoke depending on attributes of the user.

BRIEF SUMMARY OF THE INVENTION

Techniques for orchestrating workflows are disclosed herein. In an embodiment, a method of orchestrating a workflow is disclosed. In an embodiment, data is stored in a policy file, which associates attributes with processes. User input is received. A process associated with an attribute is selected, where the attribute is based on the user input. The selected process, which may include invocation of a web service, is performed as part of the workflow. The method may also include invoking a web service to read the policy file and receiving a payload of the policy file. Selection of the process in this embodiment is now done on the payload read by the web service.

In an embodiment, workflow is defined as a BPEL process and invocation of the web service may be a child process of the BPEL process. In addition, the policy file may group processes into categories and selecting the process may include invoking a category of the policy file based on user input. Empty categories which can be configured at a later time may be incorporated into the policy file. Generally, the workflow may be reconfigured by modifying the policy file.

In accordance with another embodiment, a computer-readable storage medium is disclosed. The computer readable storage medium may include instructions for causing at least one processor to perform a method of orchestrating a workflow. In an embodiment, the instructions include instructions for directing a data store to store a policy file where the policy file associates attributes with processes. The instructions also include instructions for receiving user input, selecting a process that is associated by the policy file with an attribute based on the user input, and performing the selected process. The instructions for performing the selected process may include instructions for invoking a web service associated with another processor for receiving a payload from the web service.

The computer-readable storage medium may also include instructions for invoking a web service to read the policy file and receiving a payload from the web service based on the policy file. The instructions for selecting the process may include instructions to select the process based on the payload. As above, the workflow may be defined as a BPEL process. Accordingly, the computer-readable storage medium may include instructions for invoking the web service as a child process of said BPEL process. The policy file may group processes into categories and selecting the process may include invoking a category of said policy file based on user input. The policy file may also include empty categories that may be configured at a later time. Accordingly, the computer-readable storage medium may include instructions for reconfiguring the workflow by modifying the policy file, which may include instructions for invoking a web service in order to modify the policy file.

In accordance with yet another embodiment, a system for orchestrating a workflow is disclosed. In an embodiment, the system includes a data store operable to store a policy file that associates attributes with processes, an input device operable to receive user input, a communication device operable to communicate with another communication device of another system, and a processor communicatively coupled to the data store, input device, and communication device. The processor, in an embodiment, is operable to receive the user input, to select a process of the processes that is associated, by the policy file, with an attribute that is based on the user input, and to perform the process as part of the workflow. The process may include invocation of a web service.

In an embodiment, the processor is also operable to invoke a web service to read the policy file, receive a payload from the web service based on the policy file, and select the process based on the payload. The workflow may be defined as a BPEL process and the processor may be operable to invoke the web service as a child process of said BPEL process. The policy file may group the processes into categories and the processor may be operable to select the process by invoking a category of the policy file based on the user input. As above, the policy file may include at least one empty category.

BRIEF DESCRIPTION OF THE DRAWINGS

FIG. 4 is a method of orchestrating a workflow in accordance with an embodiment.

FIG. 5 is a method for orchestrating a BPEL workflow in accordance with another embodiment.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

The following description describes an embodiment of the present invention in the BPEL domain. However, the scope of the present invention is not restricted to BPEL, but may be applied to other domains or applications. For example, any domain or application where logic coordinating actions of multiple services may make use of the present invention. Examples of domains in which embodiments of the present invention may be used include any mechanism utilizing business logic in order to coordinate functions performed by one or more web services.

In general, embodiments of the present invention provide techniques for coordinating workflows. Generally, a workflow comprises a plurality of child processes. The specific child processes that are performed may vary depending on various circumstances. In order to determine which child processes are performed as part of the workflow, a policy file is read.

Figure 1:
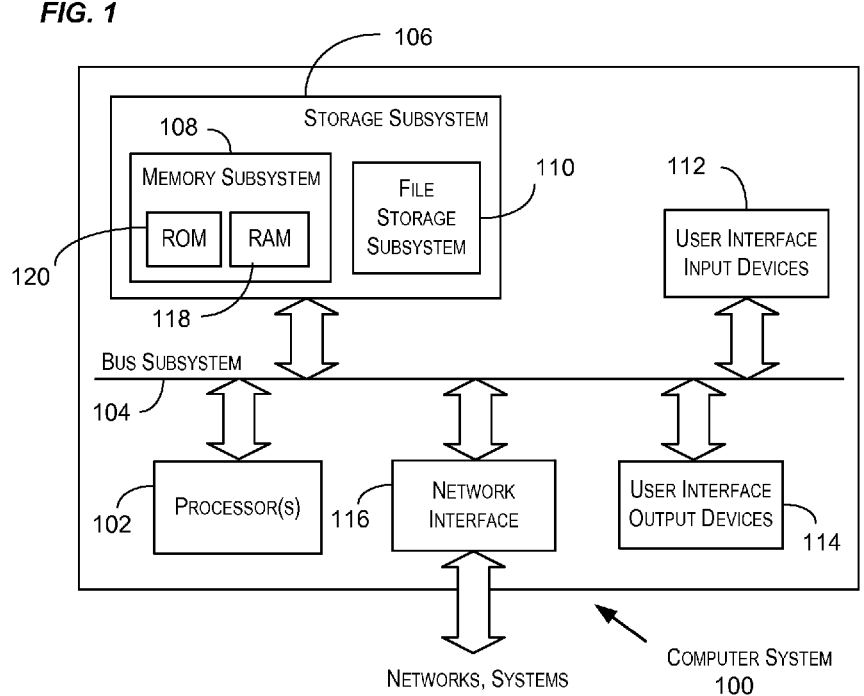
FIG. 1 shows a simplified block diagram of a computer system that may be used to practice an embodiment of the present invention.

FIG. 1 is a simplified block diagram of a computer system 100 that may be used to practice an embodiment of the present invention. Computer system 100 may serve as a processing system or a client system. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device to provide to initiate execution of a BPEL process and/or provide information as input during execution of the BPEL process.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Information related to execution of the BPEL process, such as status of the process and/or requests for user input, may be presented using an output device.

Storage subsystem 106 provides a computer-readable medium for storing the basic programming and data constructs that provide the functionality of the present invention.

Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, a server or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
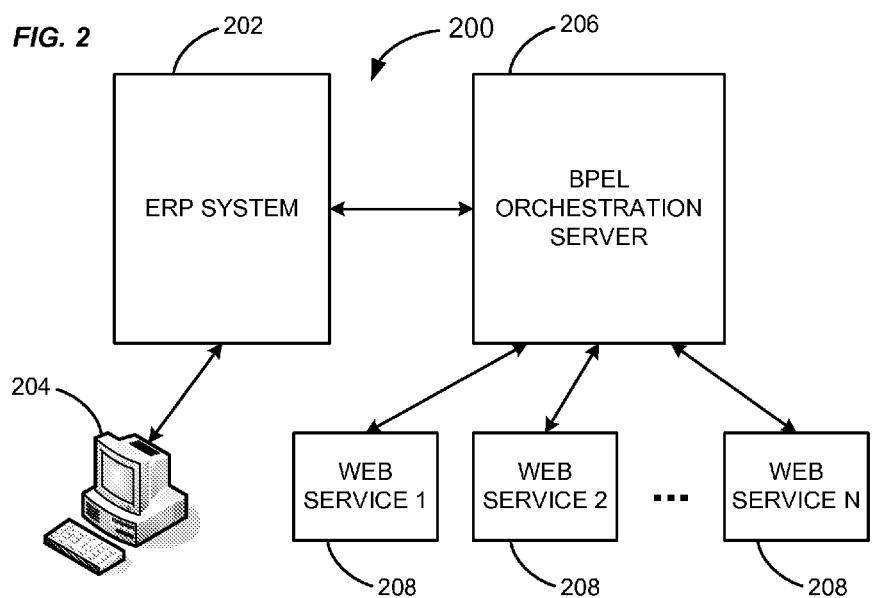
FIG. 2 shows an embodiment in which embodiments of the present invention may be practiced.

FIG. 2 shows an environment in which embodiments of the present invention may be practiced. In an embodiment, a business utilizes an enterprise resource planning (ERP) system in connection with its operations. A user of the ERP system 202 may access one or more components of the ERP system 202 through a workstation 204, which may be a personal computer or other devices communicatively connected to the ERP system. For instance, the workstation 204 may be directly connected to the ERP system or may connect to the ERP system through a communications network such as an intranet or the Internet. As shown in the drawing, the ERP system 202 may be communicatively connected to a BPEL orchestration server 206 which may be the Oracle BPEL Process Manager available from Oracle International Corporation, or any suitable BPEL orchestration server. While the drawing shows that BPEL orchestration server 206 is separate from the ERP system 202, it should be understood that separation of the BPEL orchestration server 206 and the ERP system 202 in the drawing is for the purposes of illustration and that the BPEL orchestration server 206 may be separate from the ERP system 202 or the BPEL orchestration server 206 may be a component of the ERP system 202.

BPEL orchestration server 206 may be able to communicatively connect to a plurality of web services 208 in order to execute BPEL processes that invoke the web services 208. As discussed above, any one of the web services 208 may be an internal part of the ERP system 202 or may be an external web service available from a third party. Also, any one of the web services may itself utilize another web service.

In an embodiment, when a user desires to execute a BPEL process, he or she does so through an interface of the ERP system and the BPEL orchestration server, as necessary, invokes any of the web services 208 as determined by a particular BPEL process being orchestrated.

Figure 3A:
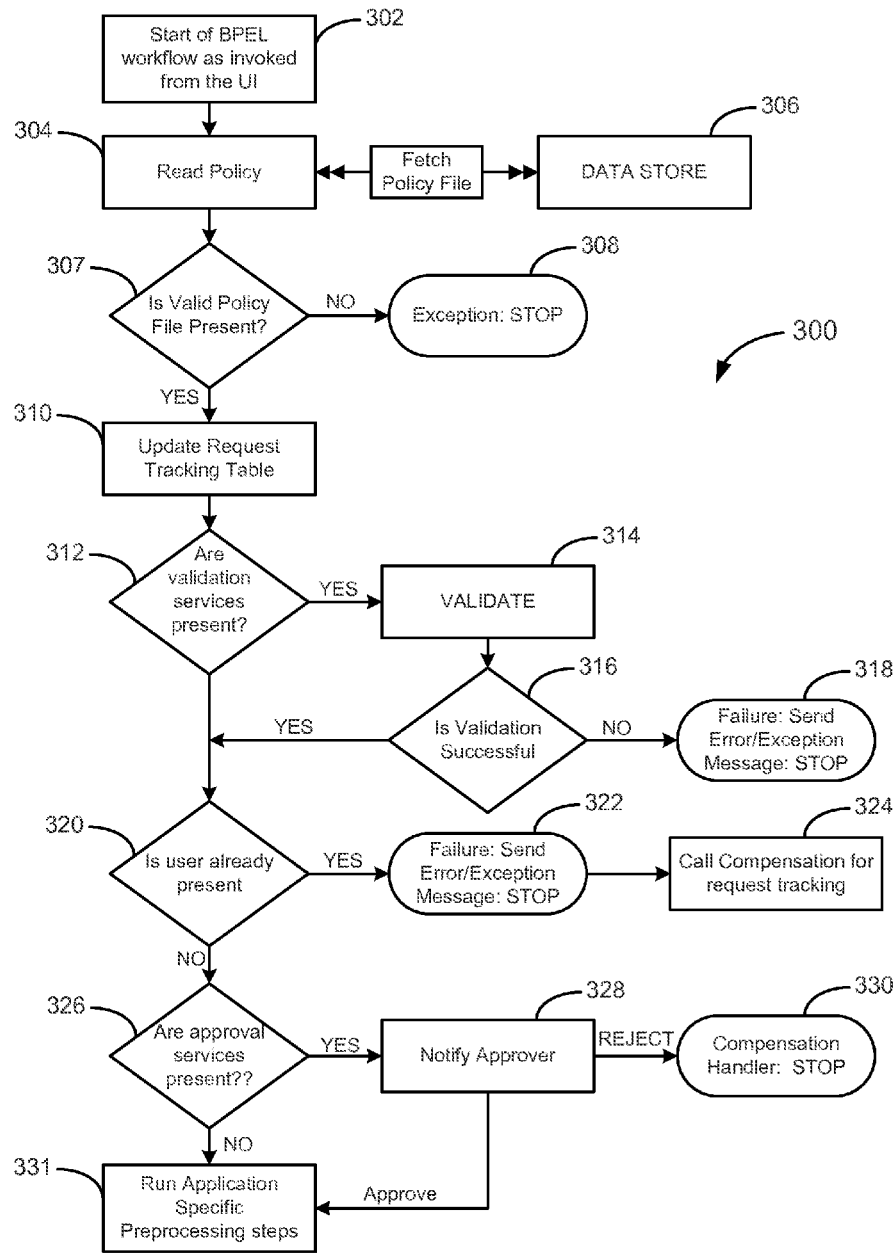
FIG. 3 is an example of a BPEL process in accordance with an embodiment of the invention.
Figure 3B:
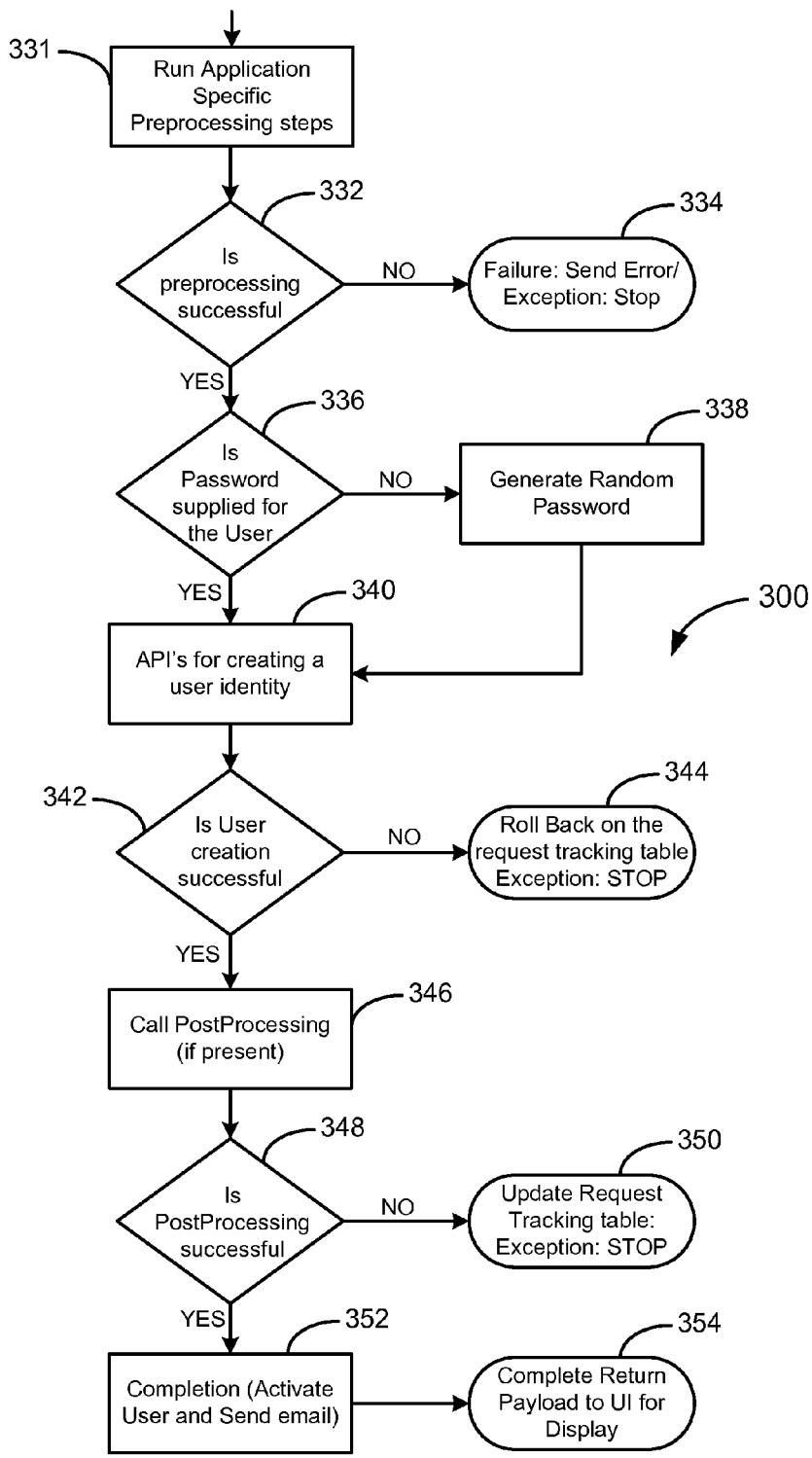

FIGS. 3A and 3B show an example BPEL process provided for the purposes of illustration of an embodiment of the present invention. In the example shown, the BPEL process is used for the creation of the user identity in an ERP system, which, as discussed above, performs when a new employee joins an organization in order to create the user's identity into various components of the ERP system. It should be understood that steps of the process shown in FIGS. 3A and 3B are for the purposes of illustration and may or not be performed in accordance with various embodiments. For example, steps described below as preprocessing or postprocessing steps may not be present in all embodiments of the present invention and, in certain embodiments, may be performed if such steps exist in the BPEL process (workflow), as described in more detail below. Generally, because different users typically have different levels of access to components of the ERP system depending on their role in an organization, the process of creation of a user identity may be different for different users. Thus, the set of child processes and/or their the functions they perform may vary according to the user whose identity is being created. In this example, in order to simplify the identity creation process, a policy file is invoked in order to determine which child processes should be performed in order to create a user identity in an ERP system. One or more attributes of a user whose identity is being created (such as the user's role in the organization) are utilized in order to read the policy file and determine which child processes should be performed.

Beginning with FIG. 3A, as shown in the drawing, the BPEL process 300 begins at a process initiation step 302 where the BPEL workflow is invoked from the user interface, such as a user interface available to a user at the ERP system. In the particular process shown, a policy file is read at a policy reading step 304. As shown, the reading of a policy may involve fetching the policy file from a data store 306. In an embodiment, the data store 306 is available as a web service and the BPEL process invokes the web service in order to receive the policy file or receive information derived from the policy file in a payload from the web service. The policy file, in another embodiment, may be stored locally and accessed by the orchestration server implementing the BPEL process 300. Further, multiple policy files may be used for a single BPEL process, where some may be stored locally and some may be accessed through invocation of a web service.

At a policy existence check step 307, a determination is made whether a valid policy file is present, that is, whether a valid policy file has been retrieved from the data store 306. If not, for example, because the data store 306 has malfunctioned, is down for maintenance, or otherwise does not provide the policy file, an exception is thrown and the BPEL process is stopped at a process stopping step 308.

If, in an embodiment, the policy file is present, the BPEL process continues and, in an embodiment, a tracking table for the BPEL process is updated at a tracking table update step. In an embodiment, the policy file is read and specific child processes to be performed are identified in the tracking table. In an embodiment, a tracking table is a table which includes information about the steps of the BPEL processes that have been completed. The tracking table may persist in memory during execution of the BPEL process. In the example shown, creation of a user identity includes validation, approval, preprocessing, and post processing, which are described in more detail below. The tracking table is updated with the specific child processes applicable to validation, approval, preprocessing, and post processing, as determined from the policy file.

Once the tracking table has been updated, a determination of whether validation services are present is made at a validation services existence-checking step 312. For example, if the user whose identity is to be created will have access to the organization's email system, he or she may choose or may be assigned an email ID. A web service of a mail server may be invoked in order to determine whether the particular email ID chosen or assigned is available for use. In an embodiment, the particular validation services needed are determined from the policy file. For example, many employees may require only email ID validation while some higher-level employees, such as managers, may require user ID validation with other systems, such as with accounting systems. The BPEL process 300 may receive as user input the level of the employee whose identity is being created and this level will be used to determine from the policy file what validation services are needed for the level.

If validation is required, then validation processes are performed at the validation step 314, such as validating an email ID or other user ID. At a validation success-checking step 316, a determination is made whether the validation was successful. For example, if a required web service has malfunctioned or if a user ID cannot be validated because it is already used by another employee, then an administrator administering the BPEL process 300 may have to take additional steps, such as choosing an alternate email ID or troubleshooting the malfunctioning web service. If validation was not successful, step 318, an exception is thrown in order to indicate an error, and the BPEL process is stopped.

If validation was successful, then the BPEL process 300 continues. In an embodiment, a user presence checking step 320, a determination is made whether the user's identity is already present in the ERP system. If the user's identity is already present in the ERP system, an exception is thrown at an exception throwing step 322. In addition, at a compensation step 324, any steps that have been taken so far in an embodiment may be undone and any changes that have been made in the ERP system are reset to the original state, as appropriate. In an embodiment, compensation takes steps necessary to roll back the workflow to a state prior to the throwing of the exception. In some instances compensation may not be possible and, in such cases, compensation may not be performed.

Some components of an ERP system may contain sensitive data or otherwise be subject to higher security policies. As a result, organizations often require approval before a new user is added to the component. In the context of a BPEL process, a child process may invoke a web service of a component of the ERP system to cause the component to issue a message, such as an email message, to an appropriate person in order to request approval from that person. Accordingly, in an embodiment, at an approval services existence-checking step 326, a determination is made whether approval services are present. This determination may be made, for example, by examining data from the policy file to determine whether any services requiring approval are present. The set of services requiring approval may vary based on the role of the person whose identity is being verified.

At a notification step 328, an approver is notified of a request for approval from the user whose identity is being created. For instance, a particular component of the ERP system such as an accounting component may require approval from a manager or other persons with authority in order to provide anyone access to the accounting system. If the approver rejects the request for approval at a compensation handler, at a compensation handling step 330 compensation is performed, such as in the manner described above. If the request for approval is approved, at a preprocessing step 331, preprocessing steps are performed in accordance with an embodiment. The specific preprocessing steps performed may be determined, for example, from the policy file. The preprocessing steps may also have some steps, which are always performed, and other steps which are performed only when dictated by the policy file as determined by any policies applicable to the user whose identity is being created.

Preprocessing may include one or more actions taken initially in order to better ensure that the BPEL process 300 is completed properly. For example, access to one or more of the ERP system components may be managed through a lightweight directory access protocol (LDAP) directory. A global unique identifier (GUID) to be stored in the LDAP directory may be assigned or chosen for the person whose identity is being verified. Preprocessing may include invoking web services of the various ERP systems in order to reserve this GUID so that an attempt to create an identity for another user with the same GUID would be unsuccessful. In this manner, for example, situations are avoided where the BPEL process 300 is started for one user and, while waiting for approval, the BPEL process 300 is started and completed for another user who has chosen the same GUID, thereby causing errors in the system due to the same GUID being associated with more than one person.

At a preprocessing success checking step 332, a determination is made whether preprocessing was successful. If not, an exception is thrown at exception authority step 334 and the BPEL process is stopped. If preprocessing was successful at a password existence checking step 336, a determination is made whether a password has been supplied for the user. If not, a random password is generated for the user at a random password generation step 338. If a password has been supplied or randomly generated for the user, the user's identity is created by invoking a Application Programming Interface (API) or by any other proprietary mechanisms, at a user creation step 340. In an embodiment, the API associates the user's GUID, password, and role in the organization with the user as necessary with the various ERP systems. Association of the user with the role, GUID, and password may be done in a component of the ERP system, such as an LDAP directory server, a flat file, a database, or other custom repository that is operable to store this information and be accessible by the various ERP components that require verification of the user's identity and role.

At a user creation success checking step 342, a determination is made whether user creation was successful. If not, an exception is thrown, the default process is stopped. In an embodiment incorporating a tracking table, the tracking table is reset accordingly in order to maintain the previous state of the workflow. In addition, the reserved GUID may be freed. Generally, the state of the workflow may be maintained and the GUID may be freed in any suitable manner. If, however, user creation was successful, post processing processes are performed at a post processing step 346. Post processing, in an embodiment, includes synchronization and/or propagation activities. For example, if the user creation step 340 utilizes an LDAP directory, there may be data sources to which the user's identity may be added other than the LDAP directory in order to allow the user to use various applications. In this case, post processing may include creating a user identity with other data sources, such as various databases, human resources portals, or other systems that do not use the LDAP as a data source. The specific systems for which post processing should occur may be determined from the policy file which may associate a user's role with the specific post processing child processes that need to be performed for that user.

At a post processing success checking step 348, a determination is made whether post processing was successful. If not, the tracking table is updated accordingly and an exception is thrown in order to stop the BPEL process. At a table update, an exception is thrown in step 350. If post processing was successful, completion of the BPEL process is performed at a completion step 352. For example, the user may be activated in the LDAP directory and an email may be sent to the user in order to notify the user that his or her identity was successfully created. The email may include details about the user's identity, such as user name. A link to a page through which a user may logon and create his or her own password may also be provided. Other information may also be included, such as the components of the ERP system which the user is required to register. The mail may be tailored to the specific user using information from the policy file which specified for which systems the user's identity was created. Also, the BPEL process extends a payload to the system used to initiate the BPEL process 300 in order to notify the person operating the system that the BPEL process 300 has completed on a user interface presented to him or her.

As discussed above, FIGS. 3A and 3B demonstrate an embodiment of the present invention in connection with the identity creation domain. The invention, however, is not limited to this domain, but may be practiced in connection with any domain in which BPEL or other business logic is employed. Examples include any domain in which BPEL or other languages with similar capability are used in order to coordinate various web services in order to complete one or more tasks.

Accordingly, FIG. 4 shows a flowchart for a general method of orchestrating a workflow 400 in accordance with an embodiment. At a policy file storage step 402, a policy file is stored in a data store such as an MDS data repository available from Oracle International Corporation. The policy file may be, for example, an xml document which stores the policy in a convenient format. For example, the following is a policy document which may be used in connection with the BPEL process of FIG. 3.

As can be seen in the example XML file, the policy file defines the web services that are to be invoked for validation, preprocessing, and post processing. In addition, the policy file directs invocation of different web services based on the role of a person whose identity is being created. For instance, a preprocessing XML element includes two stepName sub elements. The first stepName element specifies a web service to be invoked in the user has a role of VP (vice president). The second stepName specifies another web service if the user whose identity is being created is a developer.

The postprocessing XML element in the example does not specify that different web services should be invoked based on role. However, by defining the web service to be invoked in the XML file, a developer may, at a future time, specify that different web services should be invoked for post processing based on the role of the user is being created. Instead of modifying the logic of the underlying BPEL workflow being executed, the developer may simply modify the postprocessing XML element to specify which web services should be invoked for certain roles. This may be done in a manner similar to the way in which the preprocessing element performs assigns different web services to different roles. Generally, modifying the XML file in this manner is much simpler than modifying the logic of the underlying BPEL workflow because modifying the logic of the underlying BPEL workflow requires substantially more changes in coding whereas achieving the same result by modifying the XML file requires only simple, straightforward modifications.

Returning to the method of FIG. 4, at a workflow initiation step 404, a workflow begins. The workflow may, for example, be a BPEL process comprising a plurality of child processes. For example, a user of the ERP system with sufficient administrative privileges may, through a user interface, direct an orchestration server such as a BPEL orchestration server to begin a specific process such as a BPEL process.

Typically, the workflow requires some sort of user input, such as information regarding a person whose identity is

```
<?xml version="1.0" encoding="UTF-8" ?>
<policy xmlns:xsi="http://www.w3.org/2001/XMLSchema-instance">
 <policyName>create_identity_policy</policyName>
 <policyType>AccountCreate</policyType>
 <description>CreateIdentityPolicy</description>
      <provisioningSteps>
           <validation>
                <sequentialSteps>
                     <stepName>http://ValidationServiceURL</stepName>
                </sequentialSteps>
           </validation>
           <preProcessing>
                <sequentialSteps>
                     <stepName role="VP"
                     >http://PreProcessingServiceURL1</stepName>
                     <stepName role="developer"
                     >http://PreProcessingServiceURL2</stepName>
                </sequentialSteps>
           </preProcessing>
        <postProcessing>
           <sequentialSteps>
                <stepName>http://PostProcessingServiceURL1</stepName>
                <stepName>http://PostProcessingServiceURL2</stepName>
           </sequentialSteps>
        </postProcessing>
             <completion>
                  <sequentialSteps>
                       <stepName>http://CompletionServiceURL</stepName>
                  </sequentialSteps>
             </completion>
      </provisioningSteps>
</policy>
``` created in the example above, which may include first name and last name, date of birth, Social Security number and the like. For other workflows, the user input may include information relevant to the workflows and/or user selections from a list of options. Accordingly, at a user input step 406, user input relevant to the workflow is received from a user interacting with a user interface operated in connection with an orchestration server or other device executing the workflow. At a process definition step 408, at least a portion of the workflow is defined based on the policy file and/or on user input. For instance, at least one child process may be included or excluded from the workflow depending on information in the policy file, which may be based on the user input. Continuing with the identity creation example, the user input may include the type of employee whose identity is being created, such as a manager, a receptionist, a engineer, or basically any role within an organization. Generally, the policy file may be received from the data store and any process that should be executed may be identified by matching the role that was received as user input with the processes associated with that role. The policy file may be compared with user input in order to add or delete child processes from the workflow in order to perform selective execution of processes. Also, child processes may be added or deleted or changed from the workflow based on the policy file without taking into account the user input, thereby allowing a process to be dynamically updated without having attribute constraints.

In an embodiment, a single policy file is read in order to define the processes of the workflow. However, more than one policy file may be used for a single workflow. For instance, if a workflow comprises several sub-workflows, a separate policy file may be read to define child processes of one or more sub-workflows. For instance, one policy file may be maintained to define child processes for a set of related web services while another policy file may be maintained to define child processes for another set of related web services.

At a process performance step 410, the child processes that were determined according to the policy file are performed. As mentioned above, additional steps which are always performed as part of the workflow may be performed in addition to processes that are performed as a result of the policy file. Further, in an embodiment, the workflow determines the order in which the child processes are performed, although the policy file may determine the order of performance of one or more child processes. For instance, using the identity creation example above, the BPEL workflow may determine that the validation child process is executed before the preprocessing child process. However, the policy file may determine the order in which child processes of the validation child process and/or preprocessing child process are performed.

As discussed above, a policy file may be used to determine the child processes of a workflow by invoking a web service to deliver a payload based on the policy file. FIG. 5 shows a flowchart for a method of incorporating information from a policy file in order to define a workflow, in accordance with an embodiment. Steps of the method shown in FIG. 5 (or variations thereof) may be combined with steps of FIG. 4, or variations thereof.

In an embodiment, a BPEL process is begun at a process initiation step 502. For instance, beginning the BPEL process may include initiating a workflow, such as described above in connection with FIG. 4. At a web service invocation step 504, an appropriate web service is invoked to read a policy file and provide information based on the policy file as a payload. For instance, the payload may be the information in the policy file itself and/or information that is based on information in the policy file. Also, invoking the web service may include providing information to the web service from which a computing device implementing the web service may process the policy file in order to provide appropriate information in a payload. For instance, using the identity creation example, invoking the web service may include sending information about the role of the employee whose identity is being created. A computing device receiving this information and implementing the web service may use the role of the employee in order to process the policy file and provide information concerning child processes that should be performed when creating a user identity for a person with this role.

At a payload receipt step, the payload from the web service is received. As discussed above, in an embodiment, the payload includes information indicating child processes that should be performed as part of the BPEL process. As above, the payload may include the policy file itself or information derived from the policy file.

Once the information from both the payload from the web service is received, at a process definition step, the processes of the workflow through the BPEL process is defined based on the payload, such as in a manner discussed above, at a process definition step 508. At a process performance step 510, the processes of the BPEL process, as determined from the BPEL file being executed and from the payload, are performed. As discussed above, processes that are always performed in connection with the BPEL process may be included as well as processes that are determined as a result of reading the policy file.

Figure 6:
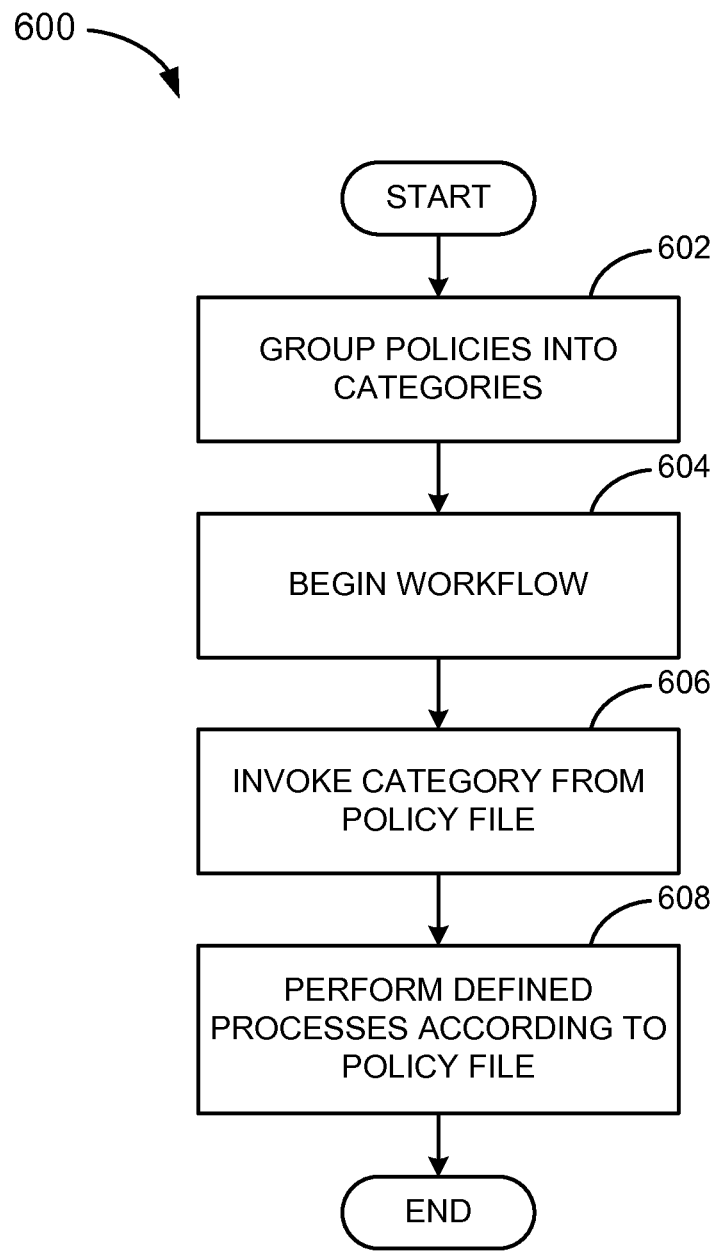
FIG. 6 shows a flow chart for a method of orchestrating workflow according to a policy file grouping policies into categories in accordance with an embodiment.

There are numerous ways in which a policy file may be invoked in order to define child processes of a BPEL process or other workflow. FIG. 6 shows a method 600 for orchestrating workflow in accordance with an embodiment in which the policy file utilizes categories and invocation of the policy file includes invoking a category. One or more steps of FIG. 6 may be performed in connection with one of the methods described above or variations thereof.

At a policy grouping step 602, policies are grouped into categories. For example, processes may be grouped according to the class of employees for which the processes should be performed. As a more concrete example, a set of processes may be associated with a vice president's role, while a different set of processes may be associated with a developer's role. Some of the processes may be common to more than one group. The policies may be grouped by an xml file that associates a plurality of processes with a plurality of categories. For example, there may be an xml element for each category and sub-element of the element for each process associated with the category. As another example, an xml file may include an element for a process, such as validation in the user identity creation example above. Sub-elements of the element may each have an attribute indicating one or more categories to which the sub-element belongs.

At a workflow beginning step, the workflow is begun, such as in the matter described above. As noted above, part of the workflow may include reading the policy file in order to determine which child processes should be performed as part of the workflow. Accordingly, in an embodiment, reading the policy file includes invoking a category from the policy file in order to define the child processes of the workflow at a category invocation step 604. For example, if the policy is invoked through a web service, invocation of the web service may include information regarding one or more relevant categories. The web service may then use those categories to read the policy file and provide a payload based on the one or more relevant categories. Generally, invoking a category from the policy includes extracting information from the policy file based on the category and extraction of this information is not necessarily performed by a web service, but may be performed by another device, such as the BPEL orchestration server executing the BPEL process. As noted above, more than one category may be invoked.

As above, the processes from the workflow may come from other processes that are a permanent part of the workflow. At a process performance step 608, the defined processes are performed as discussed above.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method for orchestrating a workflow, comprising:
   storing in a data store a policy file, the policy file at least associating user roles with one or more child processes of the workflow, the user roles identifying roles of users associated with a user input;
   receiving the user input associated with the user;
   invoking a web service of a plurality of web services to read the policy file of the data store in response to receiving the user input associated with the user;
   identifying, based at least in part on a first user role identified in the user input associated with the user and a payload received from the web service, a first set of child processes of the one or more child processes of a process identified by the workflow that is associated with the first user role identified in the user input associated with the user;
   identifying, from the policy file, a first set of one or more web services of the plurality of web services to be invoked for performing each child process of the first set of child processes associated with the first user role;
   invoking, from the policy file, the first set of one or more web services for performing each child process of the first set of child processes associated with the first user role;
   transmitting a notification of completion of the process identified by the workflow, based at least in part on performing each child process of the first set of child processes of the workflow;
   identifying a second user role in the user input;
   identifying, based at least in part on the second user role, a second set of child processes of the one or more child processes associated with the second user role; and
   identifying, from the policy file, a second set of web services of the plurality of web services to be invoked for performing the second set of child processes associated with the second user role.

2. The method of claim 1, further comprising, invoking, from the policy file, the second set of web services for performing the second set of child processes associated with the second user role.

3. The method of claim 1, wherein the workflow is defined as a BPEL.

4. The method of claim 1, wherein the policy file groups the one or more child processes into categories and wherein the identifying the first set of child processes or the second set of child processes includes invoking a category of the policy file based at least in part on the user input.

5. The method of claim 4, wherein the policy file includes at least one empty category.

6. The method of claim 1, further comprising reconfiguring the workflow by modifying the policy file, the reconfiguring the workflow comprising modifying the policy file to specify a different web service of the plurality of web services to be invoked for performing the one or more child processes of the workflow, based at least in part on the first user role or the second user role identified in the user input.

7. A non-transitory computer-readable storage medium having stored thereon instructions for causing at least one processor to perform a method of orchestrating a workflow, said instructions comprising:
   instructions for causing the at least one processor to direct a data store to store a policy file, the policy file associating user roles with one or more child processes of the workflow, the user roles identifying roles of users associated with a user input;
   instructions for causing the at least one processor to receive the user input associated with the user;
   instructions for causing the at least one processor to invoke a web service of a plurality of web services to read the policy file of the data store in response to receiving the user input associated with the user;
   instructions for causing the at least one processor to identify, based at least in part on a first user role identified in the user input and a payload received from the web service, a first set of child processes of the one or more child processes of a process identified by the workflow that is associated with the first user role identified in the user input;
   instructions for causing the at least one processor to identify, from the policy file, a first set of one or more web services of the plurality of web services to be invoked for performing the first set of child processes associated with the first user role;
   instructions for causing the at least one processor to invoke, from the policy file, the first set of one or more web services to perform each child process of the first set of child processes associated with the first user role;
   instructions for causing the at least one processor to transmit a notification of completion of the process identified by the workflow, based at least in part on performing each child process of the first set of child processes of the workflow;
   instructions for causing the at least one processor to identify a second user role in the user input;
   instructions for causing the at least one processor to identify, based at least in part on the second user role, a second set of child processes of the one or more child processes associated with the second user role; and instructions for causing the at least one processor to identify, from the policy file, a second set of web services of the plurality of web services to be invoked for performing the second set of child processes associated with the second user role.

8. The computer-readable storage medium of claim 7, wherein the instructions for causing the processor to perform the process comprise:
   instructions for causing the at least one processor to invoke, from the policy file, the second set of web services for performing the second set of child processes associated with the second user role.

9. The computer-readable storage medium of claim 7, wherein the workflow is defined as a BPEL process.

10. The computer-readable storage medium of claim 7, wherein the policy file groups the one or more child processes into categories and wherein the instructions for causing the at least one processor to identify the first set of child processes or the second set of child processes includes instructions for causing the at least one processor to invoke a category of the policy file based on the user input.

11. The computer-readable storage medium of claim 10, wherein the policy file includes at least one empty category.

12. The computer-readable storage medium of claim 7, further comprising instructions for causing the at least one processor to reconfigure the workflow by modifying the policy file, the reconfiguring the workflow comprising modifying the policy file to specify a different web service of the plurality of web services to be invoked for performing the one or more child processes of the workflow, based at least in part on the first user role or the second user role identified in the user input.

13. A system for orchestrating a workflow, comprising:
   a data store operable to store a policy file that associates attributes with one or more child processes of the workflow and operable to group at least one of the one or more child processes into categories, the attributes including at least a first role of a user, and the policy file including at least one empty category;
   an input device operable to receive user input associated with the user;
   a communication device operable to communicate with another communication device of another system; and
   a processor communicatively coupled to the data store, input device, and communication device, said processor operable to:
   receive said user input, said user input configured to identify the first role of the user;
   identify, based at least in part on the first role of the user input, a first set of child processes of the one or more child processes of a process identified by the workflow that is associated with the first user role identified in the user input;
   identify, from the policy file, a first set of one or more web services of a plurality of web services to be invoked for performing each child process of the first set of child processes associated with the first user role;
   invoke, from the policy file, the first set of one or more web services to perform each child process of the first set of child processes associated with the first user role;
   transmit a notification of completion of the process identified by the workflow, based at least in part on performing each child process of the first set of child processes of the workflow;
   identify a second user role in the user input;
   identify, based at least in part on the second user role, a second set of child processes of the one or more child processes associated with the second user role; and
   identify, from the policy file, a second set of web services of the plurality of web services to be invoked for performing the second set of child processes associated with the second user role.

14. The system of claim 13, further comprising, invoking, from the policy file, the second set of web services for performing the second set of child processes associated with the second user role.

15. The system of claim 13, wherein the processor is operable to:
   invoke, in response to receiving the user input, at least one web service of the plurality of web services to read the policy file;
   receive a payload from the at least one web service based on the policy file; and
   identify each child process of the one or more child processes of the workflow based on the payload.

16. The system of claim 15, wherein the workflow is defined as a BPEL process.

17. The system of claim 13, wherein the processor is operable to identify each child process of the one or more child processes of the workflow by invoking a category of the policy file based on the user input.

* * * * *